United States Patent Office 3,003,923
Patented Oct. 10, 1961

3,003,923
METHOD FOR PRODUCING L-GLUTAMIC ACID FROM RACEMIC GLUTAMIC ACID BY USE OF A MICROORGANISM
Shukuo Kinoshita, Masao Tanaka, Yuji Nagano, and Teruo Kishi, all of Tokyo, Japan, assignors to Kyowa Hakko Kogyo Co., Ltd., Chiyoda-ku, Tokyo, Japan, a corporation of Japan
No Drawing. Filed Nov. 4, 1959, Ser. No. 850,755
Claims priority, application Japan Nov. 14, 1958
6 Claims. (Cl. 195—29)

The present invention relates to the method for resolution of racemic glutamic acid by means of a microorganism. More particularly, it relates to the method for producing L-glutamic acid from racemic glutamic acid, in which method L-glutamic acid involved in racemic glutamic acid, in which method L-glutamic acid involved in racemic glutamic acid is easily and specifically dehydrated and converted, by use of a strain belonging to *Pseudomonas cruciviae* and its variable species, into L-2-pyrrolidone-5-carboxylic acid, which is then separated from unchanged D-glutamic acid and hydrolysed to give L-glutamic acid, and, if desired, the unreacted D-glutamic acid is racemized chemically and treated in the same way with the above. The L-glutamic acid product is of useful value as a flavoring agent or flavor enchancer in a variety of food products.

An object of the invention is to provide the method for obtaining L-glutamic acid from racemic glutamic acid easily and in a higher yield. Other objects and advantages will be apparent from the ensuing description.

For the purpose of resolving racemic glutamic acid, the inventors perceived that glutamic acid could be easily separated from L-2-pyrrolidone-5-carboxylic acid by a chemical procedure and that the latter could be converted into glutamic acid by a simple way.

After the isolation researches of a micro-organism which converts L-glutamic acid into L-2-pyrrolidone-5-carboxylic acid specifically, they found that strains belonging to *Pseudomonas cruciviae* suit the present purpose.

When a enzyme material obtained by cultivation of the strain is acted upon racemic glutamic acid, only L-glutamic acid is dehydrated quantitatively to L-2-pyrrolidone-5-carboxylic acid. Thereby, the enzymatic specificity and activity are exceptionally high, therefore the L-2-pyrrolidone-5-carboxylic acid can easily be separated and recovered in a higher yield. It may, thus, be said that an exceedingly advantageous method for producing industrially L-glutamic acid from racemic glutamic acid is now originated.

In connection with the enzymatic specificity and activity of the strain, an example of the experimental results is shown in the Table 1 which follows.

TABLE 1

*The conversion ratio of glutamic acid to L-2-pyrrolidone-5-carboxylic acid (percent)*

| Reaction period (hour) | D-glutamic acid | racemic glutamic acid | L-glutamic acid |
|---|---|---|---|
| 0 | 0 | 0 | 0 |
| 1 | 0 | 8.8 | 27.5 |
| 2 | 0 | 17.2 | 55.9 |
| 3 | 0 | 23.4 | 82.0 |
| 5 | 0 | 48.7 | 98.1 |

As shown in Table 1, the strain concerned converts L-glutamic acid into L-2-pyrrolidone-5-carboxylic acid specifically, and its enzymatic action is exceptionally powerful.

In utilizing the action of the strain in the present invention, an enzyme material such as a proliferated culture medium, the recovered cells, the cell homogenates obtained by supersonic vibrations or the enzyme obtained therefrom and the like, of the present strain may be employed, with the same result of the reaction.

For production of L-glutamic acid from racemic glutamic acid in accordance with the invention, as the first step, the above-mentioned enzyme material is acted on an aqueous solution containing racemic glutamic acid to convert L-glutamic acid involved in the solution into L-2-pyrrolidone-5-carboxylic acid. The step may be carried out by addition of the enzyme material to an aqueous solution of racemic glutamic acid and then by fermentation. The preferable concentration of the racemic glutamic acid in the fermentation mixture is about 20 to 200 mg./ml. The pH of the fermentation mixture at the beginning is preferably about 8. The preferable temperature of the fermentation is from 30 to 70° C. Usually the fermentation period ranging from 4 to 10 hours may suffice for obtainment of the substantially quantitative yield.

The second step of the invention is to separate the resulting L-2-pyrrolidone-5-carboxylic acid from the remaining glutamic acid. This may be conducted by any of the conventional procedures, but preferably by means of an suitable solvent, in which one of these compounds is soluble but the other is insoluble. Ordinarily, a solvent such as isoamyl alcohol, benzyl alcohol, isobutyl alcohol, normal-butyl alcohol, acetic esters, and the like, or a mixture thereof is used for extraction of L-2-pyrrolidone-5-carboxylic acid from the acidified fermentation mixture.

Alternatively, the second step may be conducted by precipitation of one of these compounds as its insoluble salt. For example, glutamic acid may be changed to insoluble zinc salt and then separated from L-2-pyrrolidone-5-carboxylic acid by filtration.

Further, the 2nd step may also be conducted by employing such an ion-exchanger as may adsorb glutamic acid alone and none of pyrrolidone carboxylic acid. For instance, when a reaction solution which is acidic with the pH not more than 3.2 is passed through strongly acidic cation exchange resins such as H-cycle sulfonated polystyrene type resin, the remaining glutamic acid is adsorbed on the said resin while only pyrrolidone carboxylic acid remains in the effluent. Thus, both glutamic acid and pyrrolidone carboxylic acid may be separated.

The third step of the invention is to hydrolyse the separated L-2-pyrrolidone-5-carboxylic acid to L-glutamic acid. The hydrolysis may be carried out using aqueous, acid or alkali solution in conventional procedure, the detailed explanation of which would be unnecessary since it seems to be apparent to those skilled in the art.

The D-glutamic acid which was separated from the L-2-pyrrolidone-5-carboxylic acid may, if required or if desired, be racemized by a procedure known to those skilled in the art. The resulting racemic glutamic acid may again be used as the starting material of the next batch and processed in accordance with the invention, thus, almost all of racemic glutamic acid can be derived to L-glutamic acid.

The invention will be further illustrated by the following examples, which are to be construed as by way of illustration and not by way of limitation.

EXAMPLE 1

To a culture medium containing 5 g. (grams) of meat extract, 2 g. of yeast extract, 1 g. of $K_2HPO_4$, 0.25 g. of $MgSO_4 \cdot 7H_2O$, 10 g. of NZ-amine (trade name for an enzymatic digest of casein for microbiological use), 10 g. of glucose and water to make 1 liter, and having pH 7.2, there was inoculated a strain belonging to *Pseudomonas cruciviae*, and cultivated at the temperature of 38° C. for 24 hours in an aerobic condition. One gram of the cells separated from the fermented mixture was inoculated to an aqueous solution of 2000 ml. containing 200 g. of racemic glutamic acid, and the solution having pH 8 was fermented at the temperature of 35° C. for 6 hours, thereby L-glutamic acid in the solution was converted to L-2-pyrrolidone-5-carboxylic acid almost quantitatively.

After the fermentation reaction, L-2-pyrrolidone-5-carboxylic acid was separated from the reaction mixture at pH 2.0 by extraction with 4 times volume as much of isoamyl alcohol and then redissolved in a half volume, based on said reaction mixture, of water having pH 7.0. The resulting aqueous L-2-pyrrolidone-5-carboxylic acid was concentrated to about 500 ml. under reduced pressure and hydrolysed by addition of 100 ml. of 32% (by weight) hydrochloric acid. After adjusting pH at 3.2 with sodium hydroxide, crystals which isolate were separated and dried, which were L-glutamic acid, weighing 97 g.

The reaction mixture, from which L-2-pyrrolidone-5-carboxylic acid has been separated, contained 99.8 g. of D-glutamic acid. The D-acid is racemized and again treated similarly with the foregoing procedure to yield L-glutamic acid. After all, 170 g. of L-glutamic acid was yielded from 200 g. of racemic glutamic acid.

EXAMPLE 2

From the cells prepared in the same way as Example 1, a crude enzyme preparation was prepared as follows: (i) 8 grams portions of the lyophilized cells was treated with 10 kilocycles supersonic at 0 to 3° C. in 80 milliliters of M/15 phosphate buffer for 30 minutes. (ii) After centrifugation at 8000 g. for 10 minutes, the supernatant was allowed to stand in 70° C. water bath for 30 minutes. (iii) After centrifugation its supernatant (85 milliliters) was treated with 45 milliliters saturated ammonium sulfate solution at 0° C. (to give 0.28 saturation). After 20 hours, the precipitates was removed and discarded. Its supernatant (127 milliliters) was then brought to 0.62 saturation by addition of ammonium sulfate powder. The resulting precipitate was removed by centrifuge, and lyophilized. Ten milligrams of the preparation above obtained was acted on a solution of 100 ml. containing 20 g. of racemic glutamic acid and having pH 8.0, at the temperature of 38° C. for 10 hours, whereby L-glutamic acid in the solution was dehydrated and converted into L-2-pyrrolidone-5-carboxylic acid. To the reaction mixture, there was added, at pH of not less than 7.0, 30 g. of zinc chloride, thereby D-glutamic acid in the mixture was precipitated as the zinc salt. The precipitate was filtered off, and the mother liquor containing merely L-2-pyrrolidone-5-carboxylic acid was hydrolysed by addition of 10 ml. of 6 N sodium hydroxide solution. After adjusting pH at 3.2 with hydrochloric acid, crystals which isolate, were separated and dried to yield 9.8 g. of L-glutamic acid.

The D-glutamic acid separated as the zinc salt was again racemized and the same procedure as the abovementioned was repeated. After all, 17.2 g. of L-glutamic acid was yielded from 20 g. of racemic glutamic acid.

EXAMPLE 3

To 500 ml. of a solution having the pH of 8.0 containing 50 g. of racemic glutamic acid was added 250 mg. of cell obtained in the same manner as in Example 1 for reaction for four hours at 50° C., with the resultant conversion of L-glutamic acid into L-2-pyrrolidone-5-carboxylic acid. After adjusting the pH of the reaction solution to 2.0 with hydrochloric acid, the said solution was passed through the column filled with strongly acidic cation exchange resin Amberlite IR–120 (trade name for sulfonated polystyrene type resin) which was made H-cycle with 3 N hydrochloric acid. Then the column was washed with water and about 600 ml. of the obtained effluent was condensed to about 150 ml. under reduced pressure, followed by hydrolysis of L-2-pyrrolidone-5-carboxylic acid contained in the condensed solution by addition thereto of 35 ml. of 32% hydrochloric acid. After the hydrolysis, the pH was adjusted to 3.2 with caustic soda and then the solution was cooled. Thereafter, the crystals to be separated were filtered off and dried and 23.4 g. of L-glutamic acid was obtained.

Meanwhile, 3 N hydrochloric acid was passed through the column washed with water, and D-glutamic acid adsorbed on the resin was eluted whereby 700 ml. of a solution containing 24.0 g. of D-glutamic acid was obtained. After racemizing the obtained D-glutamic acid, the above treatment was repeated. After all, 41.5 g. of L-glutamic acid was obtained from 50 g. of racemic glutamic acid.

We claim:

1. A method for producing L-glutamic acid from racemic glutamic acid, which comprises converting L-glutamic acid involved in racemic glutamic acid into L-2-pyrrolidone-5-carboxylic acid by use of an enzyme material obtained by cultivation of a strain belonging to *Pseudomonas cruciviae*, separating the resulting L-2-pyrrolidone-5-carboxylic acid from D-glutamic acid, and hydrolyzing the separated L-2-pyrrolidone-5-carboxylic acid to yield L-glutamic acid.

2. The method according to claim 1 wherein said D-glutamic caid is racemized and used as the starting material of the next batch.

3. The method according to claim 1 wherein said enzyme material is a proliferated culture medium of said strain.

4. The method according to claim 1 wherein said enzyme material is cells of said strain.

5. The method according to claim 1 wherein said enzyme material is cell homogenates of said strain.

6. The method according to claim 1 wherein said enzyme material is the enzyme obtained from said strain.

References Cited in the file of this patent

Nature, Feb. 25, 1956, article by Connell et al., pp. 377 to 378.

Journal of Biological Chemistry, article by Strecker, vol. 225, pp. 825 to 834, 1957.

Journal of Bacteriology, article by Noe et al., vol. 75, pp. 674 to 681, published June 1958, The Williams and Wilkins Co., Baltimore, Md.